(12) United States Patent
Nemir et al.

(10) Patent No.: US 7,635,284 B1
(45) Date of Patent: Dec. 22, 2009

(54) PROGRAMMABLE APPLIANCE CONTROLLER

(75) Inventors: David C. Nemir, El Paso, TX (US); Stanley S. Hirsh, El Paso, TX (US); Jan Beck, El Paso, TX (US)

(73) Assignee: X-L Synergy, El Paso, TX (US)

( * ) Notice: Subject to any disclaimer, the term of this patent is extended or adjusted under 35 U.S.C. 154(b) by 943 days.

(21) Appl. No.: 10/789,496

(22) Filed: Feb. 26, 2004

Related U.S. Application Data

(63) Continuation-in-part of application No. 09/692,892, filed on Oct. 19, 2000, now Pat. No. 6,700,333.

(60) Provisional application No. 60/160,275, filed on Oct. 19, 1999.

(51) Int. Cl.
*H01R 25/00* (2006.01)
*G05F 1/00* (2006.01)

(52) U.S. Cl. ........................ 439/646; 315/307

(58) Field of Classification Search ................ 315/291, 315/297, 299–300, 302, 306, 313, 307; 439/620.15, 439/620.21, 646, 949; 361/601, 636
See application file for complete search history.

(56) References Cited

U.S. PATENT DOCUMENTS

| | | | | |
|---|---|---|---|---|
| 3,646,438 A | | 2/1972 | Staff ........................... 324/73 |
| 3,979,601 A | | 9/1976 | Franklin ..................... 307/141 |
| 4,199,694 A | | 4/1980 | Van Zeeland .............. 307/252 |
| 4,215,277 A | | 7/1980 | Weiner et al. ................ 307/41 |
| 4,276,486 A | | 6/1981 | Ahuja et al. ................ 307/252 |
| 4,504,778 A | | 3/1985 | Evans ......................... 323/323 |
| 4,634,957 A | | 1/1987 | Hollaway ................... 323/242 |
| 4,668,877 A | | 5/1987 | Kunen ........................ 307/116 |
| 4,689,547 A | | 8/1987 | Rowen et al. .............. 323/239 |
| 4,695,739 A | | 9/1987 | Pierce ......................... 307/141 |
| 4,799,126 A | | 1/1989 | Kruse et al. ................. 361/101 |
| 4,802,057 A | * | 1/1989 | Patterson et al. ........... 361/232 |
| 4,857,759 A | * | 8/1989 | Murphy et al. ............. 307/141 |
| 4,902,906 A | * | 2/1990 | Murphy ..................... 307/117 |
| 5,030,890 A | | 7/1991 | Johnson ..................... 315/208 |
| 5,127,045 A | * | 6/1992 | Cragun et al. .............. 379/67.1 |
| 5,264,761 A | * | 11/1993 | Johnson ..................... 315/291 |
| 5,324,915 A | * | 6/1994 | Adams et al. .............. 219/494 |
| 5,359,231 A | | 10/1994 | Flowers et al. ............. 307/125 |
| 5,453,899 A | * | 9/1995 | Page ............................. 361/1 |
| 5,477,279 A | * | 12/1995 | Chang ........................ 348/730 |
| RE35,220 E | | 4/1996 | Johnson ..................... 315/208 |
| 5,504,394 A | | 4/1996 | Johnson ....................... 315/71 |
| 5,504,395 A | | 4/1996 | Johnson et al. .............. 315/71 |
| 5,643,012 A | * | 7/1997 | Mai et al. ................... 439/622 |
| 5,710,691 A | * | 1/1998 | Fowler et al. ................ 361/94 |

(Continued)

FOREIGN PATENT DOCUMENTS

GB  2159346  *  5/1985

*Primary Examiner*—Douglas W Owens
*Assistant Examiner*—Minh D A
(74) *Attorney, Agent, or Firm*—Jeffrey D. Myers; Justin R. Jackson; Peacock Myers, P.C.

(57) ABSTRACT

An apparatus and method for control of an alternating current appliance comprising locating in either an appliance plug or a plug-in module programmable control means and providing a plurality of electrical connections between the programmable control means and programming means.

30 Claims, 7 Drawing Sheets

U.S. PATENT DOCUMENTS

| | | | |
|---|---|---|---|
| 5,731,664 A | 3/1998 | Posa | 315/194 |
| 5,734,206 A * | 3/1998 | Keizer et al. | 307/116 |
| 5,753,983 A | 5/1998 | Dickie et al. | 307/141.4 |
| 5,798,581 A | 8/1998 | Keagy et al. | 307/115 |
| 5,798,620 A | 8/1998 | Wacyk et al. | 315/307 |
| 5,861,720 A | 1/1999 | Johnson | 315/291 |
| 5,861,721 A | 1/1999 | Johnson | 315/291 |
| 5,869,954 A | 2/1999 | Kurz | 323/237 |
| 5,880,578 A | 3/1999 | Oliveira et al. | 323/235 |
| 5,889,369 A | 3/1999 | Roy | 315/51 |
| 5,942,714 A * | 8/1999 | Oberlin et al. | 89/6.5 |
| 5,943,198 A | 8/1999 | Hirsh et al. | 361/42 |
| 5,955,847 A | 9/1999 | Rothenbuhler | 315/289 |
| 6,112,127 A * | 8/2000 | Bennett | 700/86 |
| 6,150,940 A * | 11/2000 | Chapman et al. | 340/568.3 |
| 6,400,995 B1 * | 6/2002 | Patterson et al. | 700/79 |
| 6,700,333 B1 | 3/2004 | Hirsh et al. | 315/291 |
| 6,710,553 B2 | 3/2004 | Logan | |
| 7,002,264 B2 * | 2/2006 | Logan | 307/115 |
| 2003/0197625 A1 * | 10/2003 | Szuba | 340/825.69 |

* cited by examiner

PROGRAMMABLE APPLIANCE CONTROLLER

CROSS-REFERENCE TO RELATED APPLICATIONS

This application is a continuation-in-part application of U.S. patent application Ser. No. 09/692,892, entitled "Two-Wire Appliance Power Controller", to Stanley S. Hirsh, et al., filed on Oct. 19, 2000, issued as U.S. Pat. No. 6,700,333 on Mar. 2, 2004, and the specification thereof is incorporated herein by reference. That application claimed priority to U.S. Provisional Patent Application Ser. No. 60/160,275, filed Oct. 19, 1999, and the specification thereof is also incorporated herein by reference.

A related application entitled "Cordset Based Appliance Controller" is being filed concurrently herewith, to David C. Nemir, et al., Ser. No. 10/789,852 and the specification thereof is incorporated herein by reference.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

COPYRIGHTED MATERIAL

Not Applicable.

BACKGROUND OF THE INVENTION

1. Field of the Invention (Technical Field)

The present invention relates to an electronic control which is completely incident within a cordset plug or plug-in module, and which enables the distributed control of an appliance. By offloading control functions from the appliance to the plug or module, the appliance itself becomes much simpler. The device represents a minimal control in that it uses very few parts, but has the advantage that it is programmable and may thus be adapted to a variety of control tasks. By implementing a programming approach that uses only three inputs, units may be built to stock and then programmed as needed, allowing for production economies of scale.

2. Description of Related Art

Static electronic controls that are resident in the plug are well known. For example, U.S. Pat. Nos. 4,853,822 (Kamijo) and 5,844,759 (Hirsh et al.) disclose electronic protective circuits that are disposed within an appliance plug and that are used to detect certain types of unsafe operating conditions, interrupting power in response thereto.

The present invention comprises a programmable electronic control which is completely incident within a cordset plug or plug-in module. By using internal electrostatic discharge protection diodes as power supply rectifying elements, a minimal implementation is achieved. Programming of the device is accomplished by only three total external connections, enabling a plug or module to be completely assembled and then programmed after the fact.

BRIEF SUMMARY OF THE INVENTION

The present invention is of an apparatus and method for control of an alternating current appliance, comprising: locating in either an appliance plug or a plug-in module programmable control means; and providing a plurality of electrical connections between the programmable control means and programming means. In the preferred embodiment, the plurality numbers no more than three. One programs the programmable control means via electronic signals from the programming means. A high frequency signal is applied to two of the no more than three electrical connections to place the programmable control means into a programming mode. A series of pulses applied to two of the no more than three electrical connections is used to control both data and clock lines during programming. A mixture of direct current and alternating current signals applied to two of the no more than three electrical connections may also be employed to place the programmable control means into a programming mode. The programmable control means is electronically configured to implement a set of control actions, and preferably comprises a microcontroller, most preferably wherein the microcontroller controls a thyristor or transistor. The programming means is preferably operated after the programmable control means is completely assembled in the appliance plug or plug-in module. The invention provides for appliance function retrofit by programming the programmable control means to enable the appliance plug or plug-in module to implement a set of appliance control functions other than an originally intended set.

The invention is also of an apparatus for powering an electrical network, comprising internal electrostatic discharge protection diodes and excluding external rectification elements of a DC power supply for the electrical network, wherein the internal electrostatic discharge protection diodes perform the function of the external rectification elements. In the preferred embodiment, each of the internal electrostatic discharge protection diodes are paralleled by a MOSFET transistor that is enhanced to form an alternative conducting path around the internal electrostatic discharge protection diodes. The alternative conducting path allows firing of a thyristor during a portion of an AC cycle when said internal electrostatic discharge protection diodes are not conducting. The invention implements an enhancement of an internal MOSFET transistor that is in parallel with one of said internal electrostatic discharge protection, such that while applying the appropriate gate voltage to a thyristor the MOSFET ensures that the thyristor is turned on.

The present invention has the following objects and advantages:

a) it implements appliance control at the point where the appliance receives electrical power;

b) it may be implemented in the plug of an electric cordset;

c) it may be implemented in a plug-in module, into which an electric appliance is attached and thereby enabling a retrofit capability for an existing appliance;

d) it can use internal static protection diodes for power supply filtering, thereby removing the requirement for external power rectification diodes;

e) it is programmable; and f) it may be programmed after the entire unit is assembled, by the use of no more than three external electrical connections, thereby allowing for assembly to be carried in bulk and programming to be carried out individually at a subsequent time, according to need.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

LIST OF REFERENCE NUMERALS

20—Electrical outlet
21—Incoming hot conductor
22—Hot prong of plug
23—Neutral conductor
24—Neutral prong of plug
26—Controller
28—Thyristor
30—Power cord connected plug to appliance
32—Plug
34—Output of thyristor
35—Outgoing hot conductor
36—Conventional plug
40—Appliance
44—Gate of thyristor
46—Microcontroller
48—Bridge rectifier
50—Filter capacitor
52—Sense resistor
53—Timing input
54—Zener diode
56—Thyristor control
58—Sense input
60—Power resistor
62—Timing input
64—Input/output pin of microcontroller
66—Static protection diode
68—Static protection diode
74—P channel MOSFET transistor
76—N channel MOSFET transistor
80—Input buffer
82—I/O pin
84—I/O pin
86—Chip common
90—Data state storage capacitor
92—Charge resistor
94—Clock input during programming, sense input during operation
96—Data input
98—Capacitor
102—Zener diode
104—Inductor
106—Blocking diode
108—Logic one threshold
110—Logic zero threshold

DETAILED DESCRIPTION OF THE INVENTION

The present invention is of a method and apparatus for implementing a programmable appliance control cordset or module. The device may be "built to stock", that is, it may be built as a generic article in large number without building in a specific feature set. Then, some quantity of devices may be programmed with specific features at a later date. In some implementations, the devices may even be reprogrammed at a subsequent date to deliver a different feature set. The advantage is that the cordset/module may be constructed as a generic article. The same unit may be assembled in large quantities but with programming, many different applications may be addressed.

Figure 1:
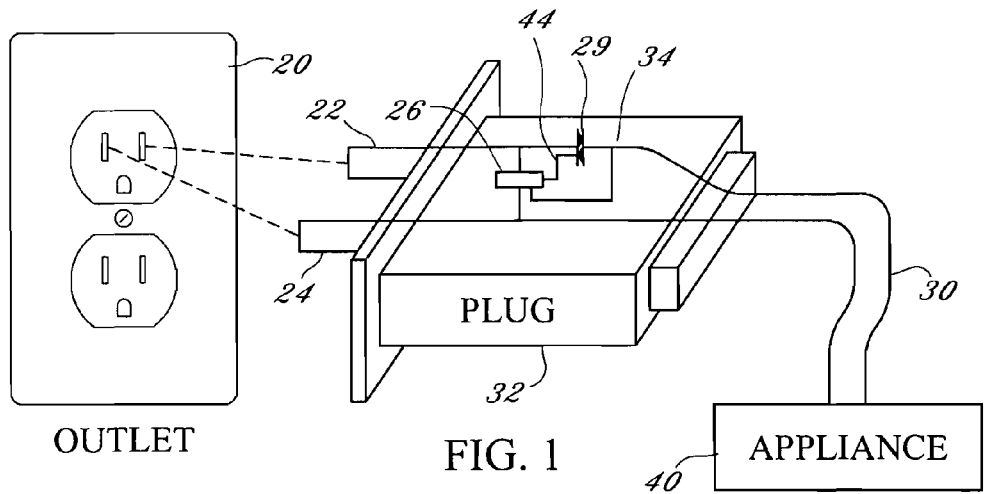
FIG. 1 is a block diagram depicting a specific embodiment of the present invention as implemented in a plug cap.

FIG. 1 depicts a block diagram of one embodiment of the programmable controller of the present invention. The appliance power cord plug 32 is configured to be inserted into a wall outlet 20 in order to receive power. An electronic circuit comprising a controller 26 and thyristor 28 together with associated electronics as needed, is completely enclosed within plug 32. Power delivery to the appliance 40 is controlled from within the plug 32 by means of the control of thyristor 28. Controller 26 is resident within the plug 32 and determines whether or not (and when) to turn on thyristor 28. Controller 26 turns on thyristor 28 by means of a control voltage applied to thyristor gate 44. The controller 26 may receive commands from the appliance 30 or from the outlet 20 as described in co-pending applications.

Figure 2:
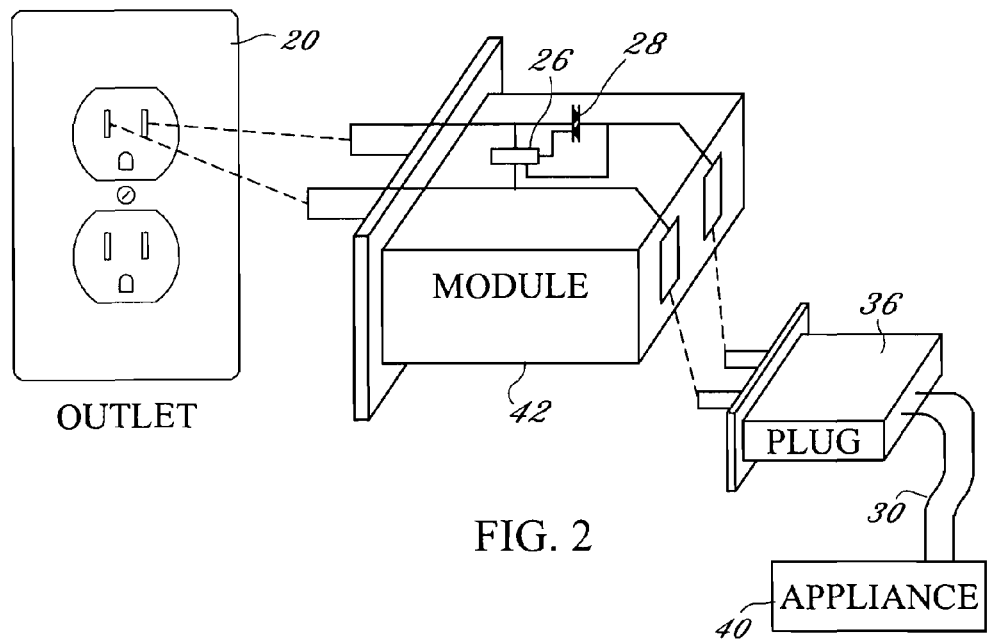
FIG. 2 depicts an alternative specific embodiment of the present invention as implemented in a module.

FIG. 2 depicts a block diagram of a second embodiment of the programmable controller of the present invention. In this implementation, the appliance power cord is attached to a conventional plug 36 which does not have internal electronic components but is of standard construction. The conventional plug 36 is inserted into a module 42 which implements the control functions. The module 42 contains a controller 26 and thyristor 28 together with associated electronics as needed. In this way, the combination of conventional plug 36 and module 42 serves the same function as that of the electronic plug 32 in FIG. 1.

Figure 3:
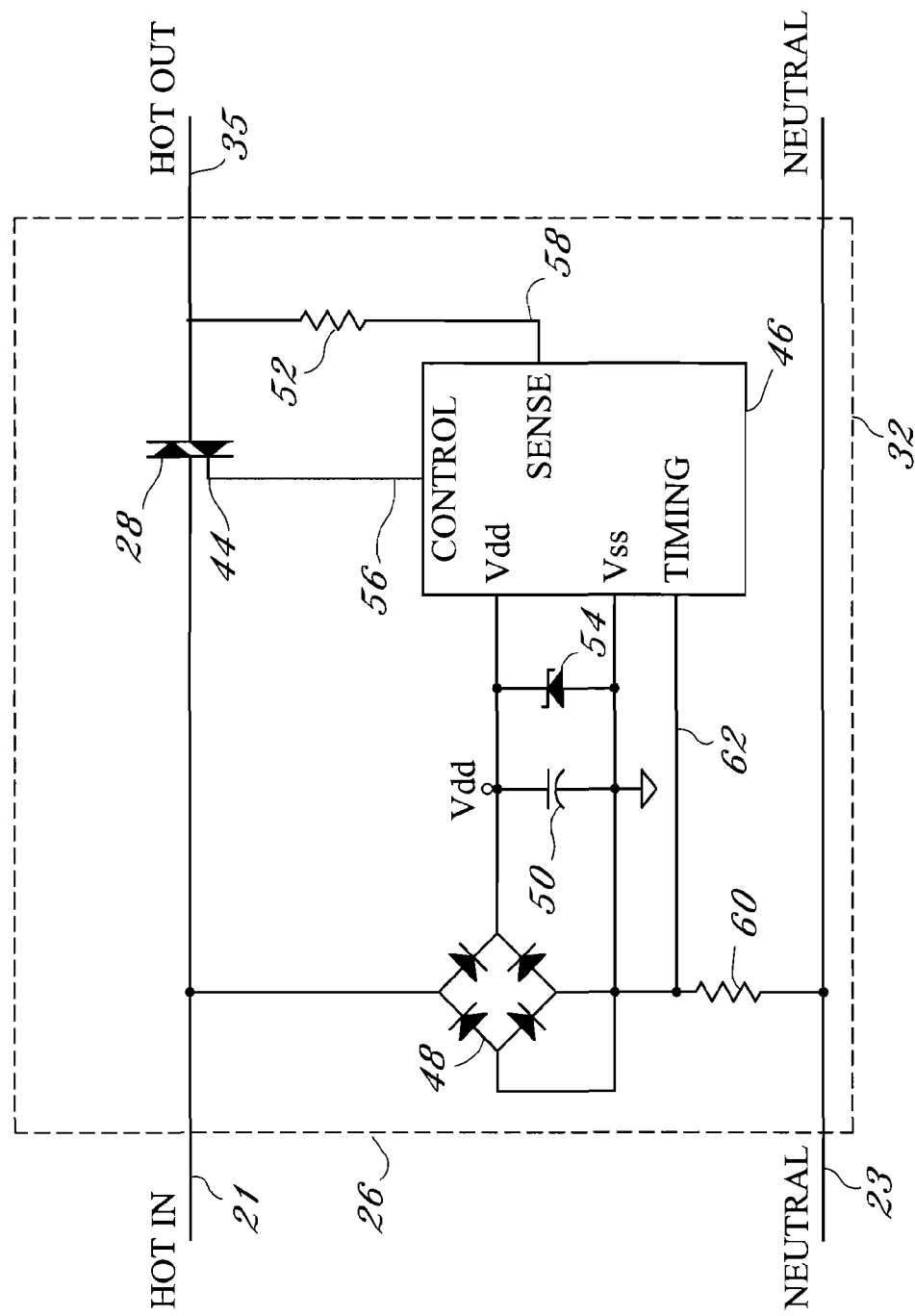
FIG. 3 depicts a specific embodiment of a microcontroller based controller.

FIG. 3 depicts one embodiment for the electronic circuit inside the plug 32. Although the following discussions assume a plug configuration, they could apply equally well to the module implementation depicted in FIG. 2. In FIG. 3, the incoming power lines are labeled as hot in 21 and neutral 23. In a grounded neutral electrical system, the so-called "hot" conductor is ungrounded while the "neutral" conductor is connected to earth ground somewhere within the electrical system. In the present application, the distinction between hot and neutral is immaterial and in some embodiments, the two could be transposed with no loss of function. An alternating current source voltage is applied to conductors 21 and 23. In the U.S., this is generally a 120 volt rms sinusoidal supply that has a frequency of 60 hertz, although the circuit could be used with other power sources. Control actions are taken by a microcontroller 46 which is a device which may be programmed to carry out various control algorithms. Resistor 60 is a power supply resistor which furnishes power to the microcontroller directly from the neutral line 23. Bridge rectifier 48 serves to convert the alternating current source voltage into a direct current voltage and this DC voltage is filtered by capacitor 50 and regulated by zener diode 54 to provide the power supply voltage for microcontroller 46. The microcontroller 46 controls thyristor 28 by output line 56. The microcontroller 46 receives timing information (the state of the AC power line) from timing input 62. The microcontroller 46 receives information about the load from sense input 58. Although not depicted in FIG. 3, all microcontrollers must have a clock, either internal or external, to control the sequencing of instructions. For many microcontrollers, the clock will be internal and, accordingly, no external clock or oscillator is depicted in FIG. 3.

It should be noted that there are effectively three external electrical connections connecting to plug 32, namely incoming hot conductor 21, outgoing hot conductor 35 and neutral 23. Although the neutral conductor 23 is depicted as being connected to plug 32 in two places, electrically, it is regarded as a single conductor.

Figure 4:
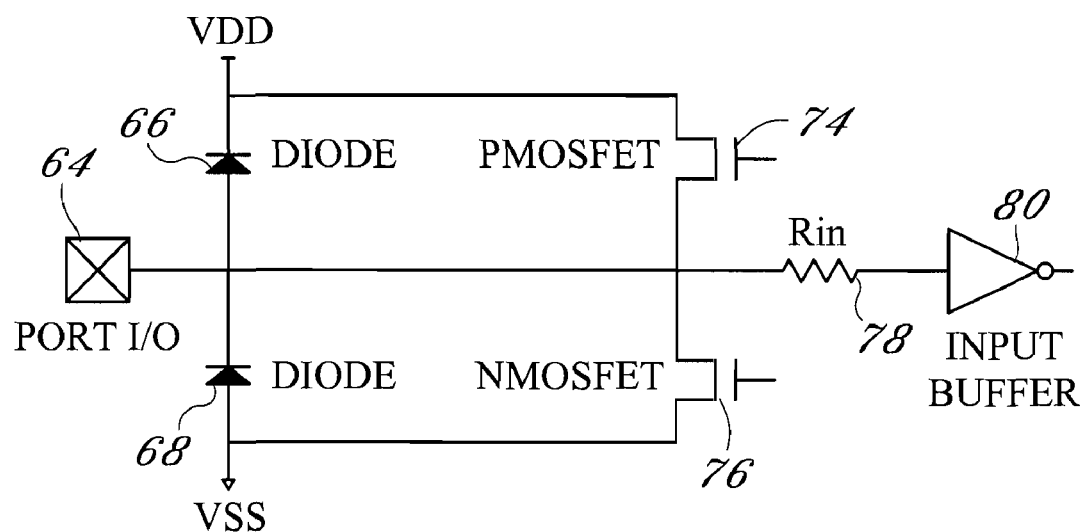
FIG. 4 depicts the function of the internal static protection diodes.

FIG. 4 depicts the internal static protection diodes that are built into many commercially available microcontrollers. By making use of the electrostatic discharge (ESD) protection diodes that are commonly built into the input-output (I/O) pins of off-the-shelf complementary metal oxide (CMOS) integrated circuits, including CMOS microcontrollers, the circuit of FIG. 3 may be simplified. Such simplifications are important in order to arrive at the absolute minimum parts count and consequently the absolute minimum cost. FIG. 4 depicts an I/O pin 64 and the associated internal ESD diodes 66,68, input buffer 80 and output drivers 74,76. In a CMOS microcontroller, the I/O pins are generally internally selectable under program control to be either high impedance (using buffer 80) inputs or to be output drivers. If a given I/O pin is chosen to be an output, then the MOSFET transistors 74 and 76 are used to drive the output to either the positive power supply potential Vdd or to the negative power supply potential Vss. Diode 66 serves to clamp I/O pin 64 to the Vdd power supply bus that is internal to the microcontroller. In other words, diode 66 serves as a low impedance path to Vdd in case a high voltage potential is applied to an I/O pin, thereby protecting transistor 74 from being destroyed due to unintentional electrostatic discharge. In a similar way, internal diode 68 serves to clamp I/O pin 64 to the Vss bus in the case that a potential that is more negative than Vss is applied, and thereby protecting transistor 76 from being damaged.

By applying a current limited AC waveform between two ESD protected I/O pins on a microcontroller, the internal ESD diodes can be used to implement a full wave bridge rectifier. In other words, ESD diodes that are already internally present in many CMOS integrated circuits, and in particular, in most CMOS microcontrollers, may be used to replace the external rectification elements that were depicted in FIG. 3.

Figure 5:
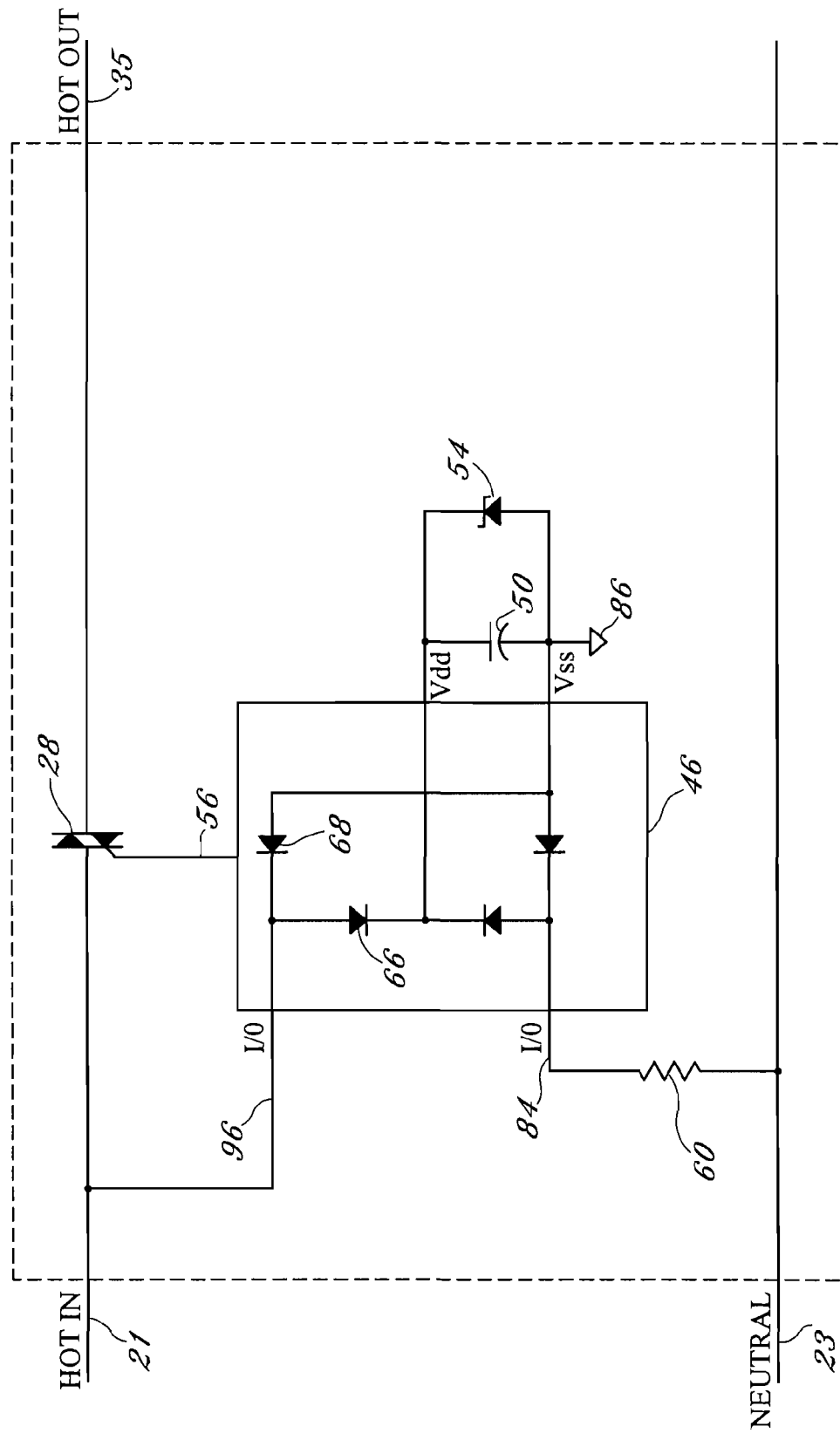
FIG. 5 depicts the role of the internal static protection diodes as used for rectification.

FIG. 5 depicts an implementation of the appliance controller that makes use of the internal static protection diodes to implement the power supply. The incoming hot conductor 21 is connected directly to an input/output pin 82. The neutral conductor 23 is connected to an input/output pin 84 through a power resistor 60. Internal to the microcontroller 46, the ESD diodes serve to make a connection to the microcontroller 46 power supply pins denoted as Vdd and Vss. The filter capacitor 50 serves to filter and zener diode 54 serves to regulate the DC power supply as discussed in conjunction with FIG. 3. Moving the rectification elements to be internal to the microcontroller allows for circuit simplification since the microcontroller already has built-in static protection diodes. Omitting the external rectification diodes enables the programming of the microcontroller via minimal external electrical connections as will be discussed in conjunction with FIG. 6.

Once the power supply voltage has been established, the ESD diodes only conduct during the interval when the applied AC voltage is greater than the sum of the power supply voltage plus the voltage drops of the ESD diodes. Because of this, gate current for turning on thyristor 28 (via control line 56) would normally only be available while one of the ESD diodes is conducting to form a conduction path for the gate circuit. This is satisfied for most of each half cycle, but not near the zero crossings. To allow gate current anywhere, even at the zero crossing, an alternate conduction path must be provided around each of the ESD diodes. This is accomplished by enhancing the MOSFET transistor (refer to FIG. 4) that is in parallel to the diode that would conduct to the hot conductor 21, while applying the appropriate gate voltage to the thyristor 28. The gate circuit for the thyristor is now completed with gate current being provided by the filter capacitor 50. By synchronously controlling the AC input port and the thyristor gate control 56, the present invention can implement synchronous rectification as well as having complete control over the thyristor 28.

Figure 6:
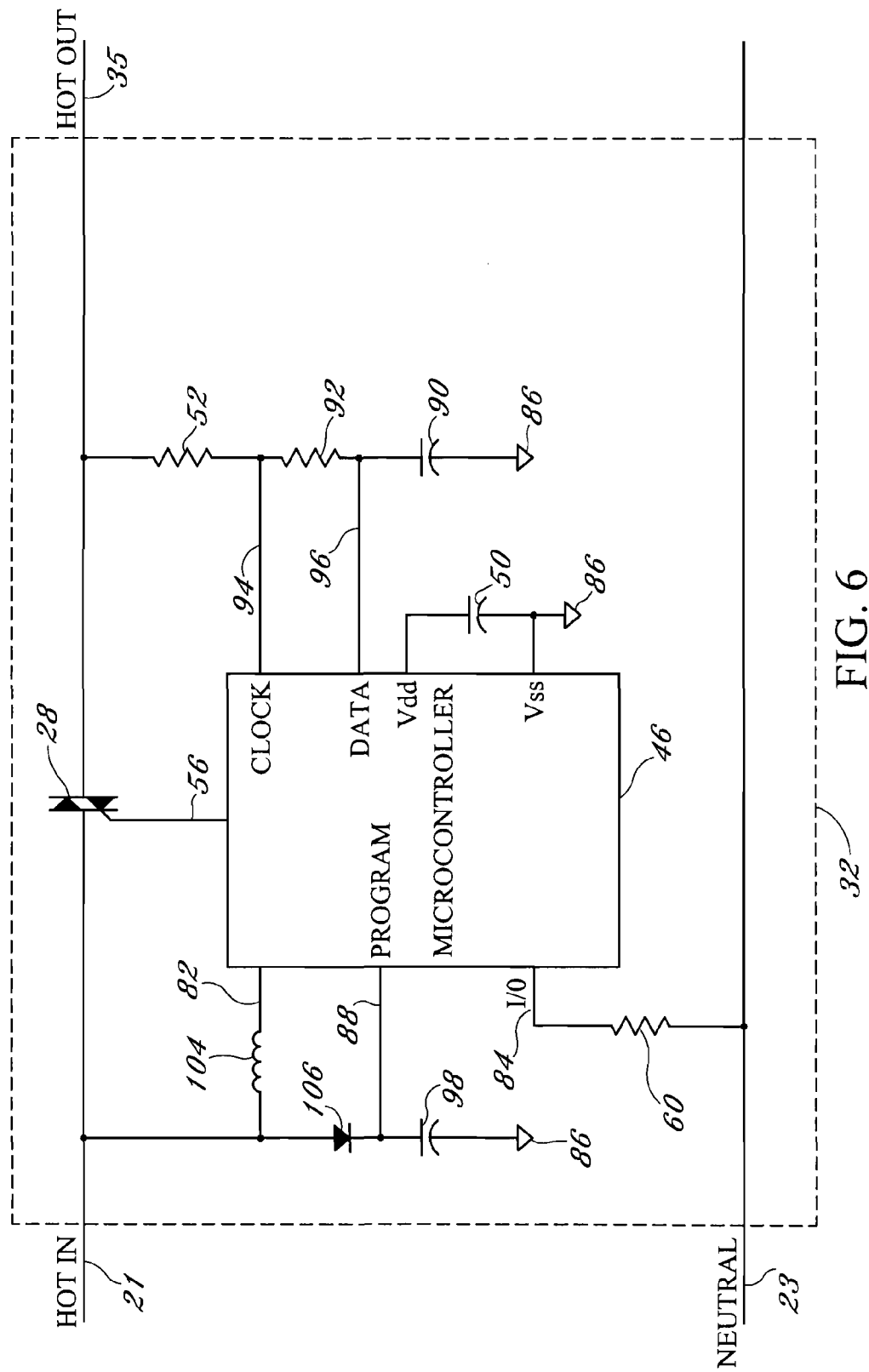
FIG. 6 depicts the external components required for programming.

FIG. 6 depicts a preferred embodiment wherein programming may be accomplished by the use of only the three external electrical connections that are available in the assembled unit, namely, common (or neutral), input and output. In FIG. 6, the plug 32, is shown as having four external electrical connections, of which only three, namely 21, 23 and 35 are unique (since the neutral conductor 23 is simply a pass through connection). The microcontroller 46 may represent any standard CMOS based microcontroller such as the 12C508 style of one time programmable device or the 12F629 style of flash programmable device, both of which are manufactured by the Microchip Corporation. As described in conjunction with FIG. 5, two connections, 82 and 84, are used to develop a DC power supply voltage and to charge power supply capacitor 50. Capacitor 50 is chosen to be of a sufficient size to maintain the power supply voltage for short intervals of time, even in the absence of applied power.

In order to place microcontroller 46 into a programming mode, the programming line 88 must be pulled to a voltage that, referenced to Vss, is substantially higher than Vdd. In order to do this, a charge pump has been added that consists of diode 106 and capacitor 98. This serves as a means to apply a high voltage to programming line 88. Due to the fact that the internal ESD diodes will clamp line 82 to within a diode drop of the Vdd level, it is preferred to add inductor 104 in series with input 82. Inductor 104 serves as a so-called "choke". Inductors have an impedance that is proportional to frequency. Inductor 104 is chosen so as to have a low impedance at 60 hertz input so that it will not result in a substantial voltage drop during normal operation. However, during programming, it is desirable to apply a high frequency AC wave across lines 21 and 23 to charge up capacitor 98 through resistor 100. By choosing an excitation of, perhaps, 60 KHz, the AC impedance of inductor 104 is increased by a factor of one thousand and serves to block this high frequency signal. So, during programming only, by applying a signal of $V_1+V_2 \sin(\omega t)$ volts across lines 21 and 23, where V1 and V2 are constant voltages and w is a high frequency relative to 60 Hz, it is possible to both maintain a voltage Vdd on power supply capacitor 50 (through the DC component $V_1$) and to maintain a voltage on programming capacitor 98 that is higher than Vdd. It should be noted that in FIG. 6, the voltage reference for programming and operation of microcontroller 46 is the common 86 which has a potential of Vss.

During normal operation, the voltage across lines 21 and 23 will be either 50 Hz or 60 Hz, which is a sufficiently low frequency that inductor 104 acts like a short circuit. In this case, due to the internal ESD diodes within the microcontroller 46, capacitor 98 will be charged to a value that is close to Vdd.

When the programming line 88 is held to a voltage that is substantially higher than the power supply value, Vdd, the microcontroller 46 is placed into a programming mode. During that time, programming signals called data and clock (lines 94 and 96) may be used to store a computer program into microcontroller 46.

It should be noted that there are alternative means for generating a relatively high voltage at programming line 88. One such means does not require an inductor. Instead, by capacitively coupling programming line 88 to the neutral 23, it is possible to develop the required voltage level using a charge pump. As in the circuit in FIG. 6, the key idea is that by applying a mixture of AC and DC signals between conductors 21 and 23, it is possible to both deliver power to the microcontroller, as well as generate a programming control signal. By taking care to avoid using signals (eg: 120 volts RMS at 60 Hz) that are likely during normal operation, programming may be accomplished without concern that an accidental programming event might occur during normal appliance operation.

During programming, thyristor gate 56 is in a high impedance condition and thyristor 28 is turned off. This serves to isolate conductors 21 and 35 so that during programming, signals imposed upon one side of the thyristor 28 do not impact the other side. Capacitor 90 serves to hold the voltage state on the data input 96 for short intervals, regardless of the value of the clock line 94. This allows for both clock and data signals to be implemented from line 35 through the resistor 52. Different microcontrollers will have different programming sequences, but an examination of one specific case is easily transferred into the general case. Suppose that the microcontroller 46 recognizes the data on line 96 whenever the clock line 94 goes from a high to a low state (a so-called falling edge trigger). So, the clock will always end up in a low state (logic zero) after programming each data bit. There are four programming possibilities as enumerated in FIG. 7.

Figure 7:
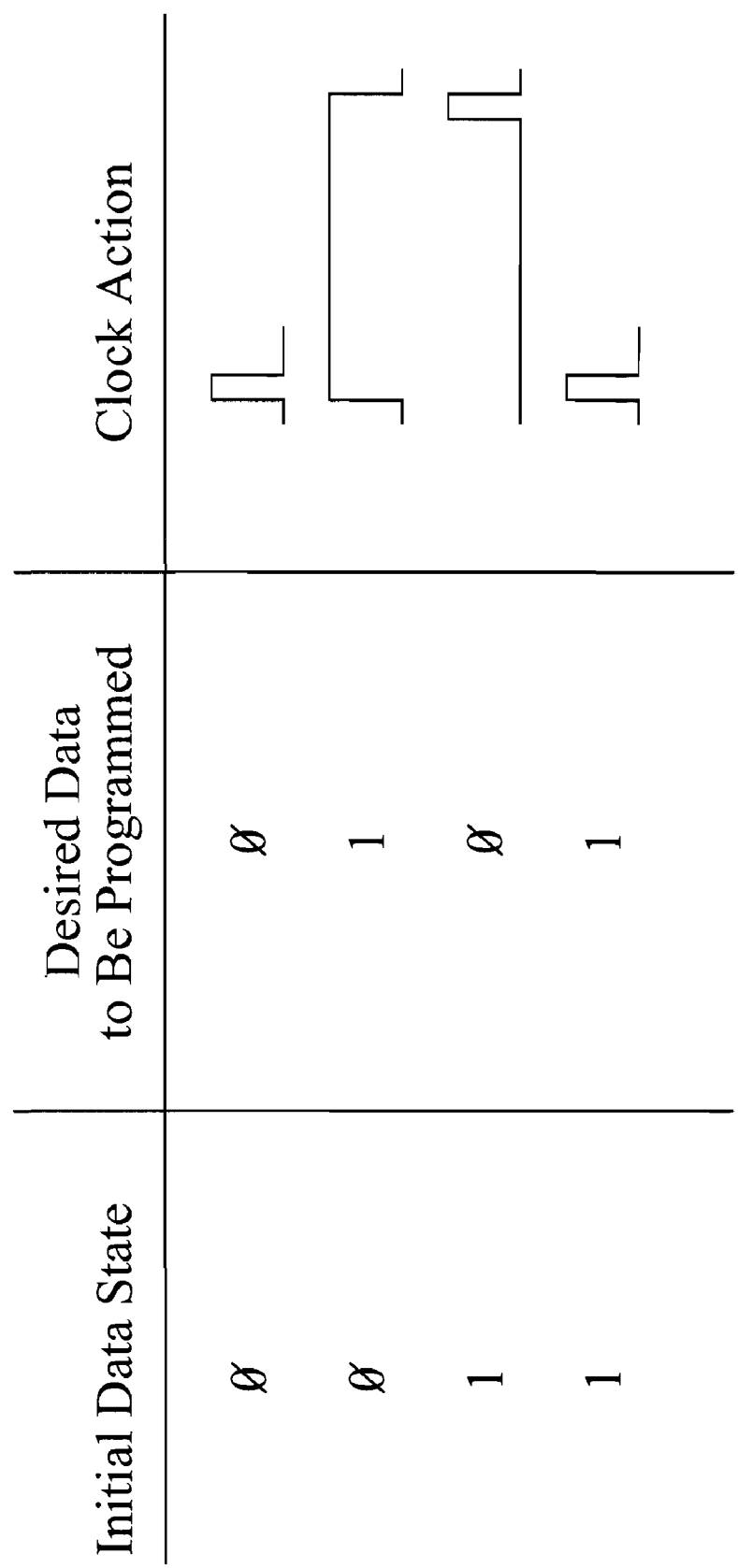
FIG. 7 depicts the state table for programming tasks.

As depicted in FIG. 7, if the initial data state (as defined by the state of charge on capacitor 90) is the same as the data bit that it is to be programmed, then the clock state, as defined by the voltage imposed on conductor 35, is brought to a high state, then a low state over a time interval that is sufficiently short that it does not cause capacitor 90 to change state. If the initial data state is a zero (corresponding to a discharged capacitor 90), and it is desirable to program a data bit of one, then the clock line 94 is pulled high for a time interval that is sufficient to charge capacitor 90 to a binary one level. Then the clock makes a low going transition to program the data value of one. If the initial data state is one and it is desirable to program a zero, then the clock line is left in a low state for a sufficient period of time to ensure that the capacitor 90 discharges. Then the clock line makes a high, then a low transition to program the data value of zero. Note that programming may take place asynchronously, since it is quicker to program a data bit if a state change is not required. Alternatively, programming could be designed to take a known amount of time for each bit by discharging the capacitor 50 after each bit is programmed and always starting from a state of zero (corresponding to the first two rows in FIG. 7).

Figure 8:
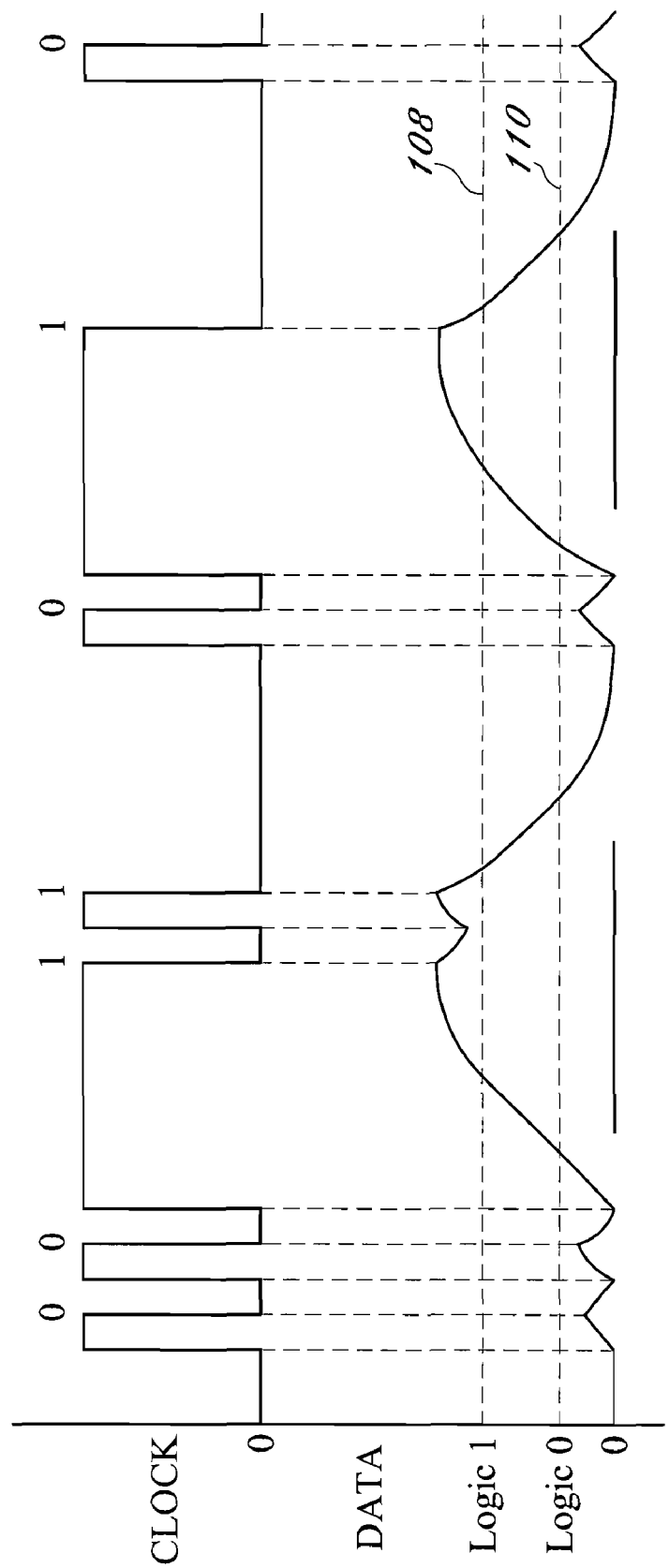
FIG. 8 depicts a timing diagram for programming a sample bit stream.

FIG. 8 depicts the timing diagram for asynchronously programming the bit sequence 0011010. Notice that the data line has a voltage value that is stored on a capacitor. This capacitor may be charged and discharged with a time constant (which will be determined by the capacitor value as well as clock voltage and limiting resistors). Whenever the clock is in the high state, it charges the data line. In the low state it discharges the data line. If the voltage on the data line has a value higher than some threshold 108 when the clock signal makes a low going transition, this will be recognized as a "one". If the voltage on the data line has a value lower than some threshold 110 when the clock signal makes a low going transition, this is recognized as a "zero". The values of thresholds 108 and 110 are characteristic to the specific microcontroller type.

Although FIG. 6 depicts the elements required for programming, after programming, plug 32 may be used as a part of a control appliance. In particular, the clock line 94 may now be used for sensing the state of a load that is attached to conductor 35. The data line 96 could be set to be a tristate input and would have no use in the normal operation of the device. A key implication of the construction depicted in FIG. 6 is that all electronic circuitry can be assembled into a plug or module and completely covered in plastic or other insulating material. It is not necessary to have access to the internal circuitry in order to program the device. Instead, by simply making use of the inputs (which are at the plug prongs) and the hot output (35 in FIG. 6), programming may be accomplished at a later date. This has favorable implications for manufacturing. It may be desirable for a cordset that is used for electric lamps to have a different program than a cordset that is used for electric fans. However, the electronic assembly (the "hardware") is identical for both products. By having the ability to program the device after construction, appliance cords can be built in bulk without programming and placed into inventory. Then, prior to shipment, they can be programmed with the correct sequence of instructions. In a similar way, modules that are designed to implement lamp dimming or lamp fading or automatic lamp turn off can be manufactured at the same time and in the same way and then programmed at some time after assembly to be a dimmer, a fader or an automatic turn-off.

As configured in module form, the present invention allows a means for retrofit of an existing appliances. By adding an appropriately programmed module to the plug of an appliance, the control configuration may be modified. So, for example, if an appliance was designed to behave in a certain manner, through the addition of an appropriately configured module, it might be possible to modify the behavior to have a different function.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. An apparatus for control of an alternating current appliance, said apparatus being entirely resident within an appliance plug, said plug comprising power delivery conductors, and said apparatus comprising a programmable controller which is programmable exclusively through a plurality of the power delivery conductors.

2. The apparatus of claim 1 wherein said plurality numbers no more than four.

3. The apparatus of claim 2 wherein two of said no more than four are electrically shorted together such that said plurality of power delivery conductors consists of not more than three electrically unique power delivery conductors.

4. The apparatus of claim 3 wherein a programming signal is applied to two of said not more than three electrically unique power delivery conductors.

5. The apparatus of claim 4 wherein said programming signal comprises a series of pulses.

6. The apparatus of claim 3 wherein a data line and a clock line of said controller are controlled by application of a programming signal applied to two of said not more than three electrically unique power delivery conductors.

7. The apparatus of claim 3 wherein a mixture of direct current and alternating current signals is applied to two of said not more than three electrically unique power delivery conductors.

8. The apparatus of claim 7 wherein said mixture of direct current and alternating current signals places said programmable controller into a programming mode.

9. The apparatus of claim 8 wherein at least one of said signals comprises a high frequency signal.

10. The apparatus of claim 1 wherein said programmable controller is electronically configured to implement a set of control actions.

11. The apparatus of claim 1 wherein said programmable controller comprises a microcontroller.

12. The apparatus of claim 1 wherein said controller controls an element selected from the group consisting of thyristors, transistors, triacs, and combinations thereof.

13. The apparatus of claim 1 wherein said programmable controller is programmed via electronic signals from a programmer.

14. The apparatus of claim 1 wherein the controller is programmable after said apparatus is assembled and the controller of the apparatus is entirely resident within said appliance plug.

15. The apparatus of claim 1 wherein said apparatus enables an appliance electrically connected thereto to operate in a manner different from that originally intended.

16. The apparatus of claim 1 wherein said plug is a plug portion of a plug-in module.

17. A method for control of an alternating current appliance, the method comprising the steps of:
providing a programmable controller;
providing an appliance plug;
disposing the programmable controller within the appliance plug;
providing a plurality of electrical power delivery conductors;
programming the controller exclusively by applying one or more signals to two or more of the power delivery conductors.

18. The method of claim 17 wherein the programming step comprises applying one or more signals to no more than three of the power delivery conductors.

19. The method of claim 17 additionally comprising programming the programmable controller with electronic signals communicated from a programmer to the controller through one or more of the power delivery conductors after the controller has been disposed in the appliance plug.

20. The method of claim 19 additionally comprising the step of applying a series of pulses applied to two of the power delivery conductors to control both data and clock lines during programming.

21. The method of claim 19 additionally comprising applying a mixture of direct current and alternating current signals to two of the power delivery conductors to place the programmable controller into a programming mode.

22. The method of claim 17 additionally comprising the step of applying a high frequency signal to two of the power delivery conductors to place the programmable controller into a programming mode.

23. The method of claim 17 additionally comprising the step of electronically configuring the programmable controller to implement a set of control actions.

24. The method of claim 23 wherein the step of providing a programmable controller comprises providing a microcontroller.

25. The method of claim 17 further comprising the step of providing an element selected from the group consisting of thyristors, transistors, triacs, and combinations thereof.

26. The method of claim 17 additionally comprising the step of controlling an appliance by programming the programmable controller so as to enable the appliance to perform in a manner different from its original design.

27. The apparatus of claim 17 wherein said plug is a plug portion of a plug-in module.

28. An apparatus for powering an electrical network comprising:
a programmable controller comprising a microcontroller; and
electrostatic discharge protection diodes internal to said microcontroller and excluding rectification elements of a DC power supply external to said microcontroller, each of said diodes paralleled by a MOSFET transistor that forms an alternative conducting path around each of said internal electrostatic discharge protection diodes;
wherein said internal electrostatic discharge protection diodes provide a source of direct current for said microcontroller.

29. The apparatus of claim 28 wherein said alternative conducting path allows firing of a thyristor during a portion of an AC cycle when said internal electrostatic discharge protection diodes are not conducting.

30. The apparatus of claim 28 additionally comprising an internal MOSFET transistor that is in parallel with one of said internal electrostatic discharge protection diodes, wherein while applying a gate voltage to a thyristor said MOSFET ensures that said thyristor is turned on.

* * * * *

UNITED STATES PATENT AND TRADEMARK OFFICE
CERTIFICATE OF CORRECTION

PATENT NO.        : 7,635,284 B1
APPLICATION NO.   : 10/789496
DATED             : December 22, 2009
INVENTOR(S)       : Nemir et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1006 days.

Signed and Sealed this

Ninth Day of November, 2010

David J. Kappos
*Director of the United States Patent and Trademark Office*